Aug. 16, 1966   G. J. O'KANE ETAL   3,266,122
METHOD OF MANUFACTURING A SPRING SEAT COMPONENT
Filed Dec. 17, 1964   2 Sheets-Sheet 1

INVENTORS
GERARD J. O'KANE
VERNON R. ROBB
DONALD E. GUNLOCK
GEORGE C. KINDE
BY
*Robert L. Spencer*
ATTORNEY Aug. 16, 1966     G. J. O'KANE ETAL     3,266,122
METHOD OF MANUFACTURING A SPRING SEAT COMPONENT
Filed Dec. 17, 1964     2 Sheets-Sheet 2

INVENTORS
GERARD J. O'KANE
VERNON R. ROBB
DONALD E. GUNLOCK
GEORGE C. KINDE

BY

*Robert L. Spencer*
ATTORNEY

United States Patent Office 3,266,122
Patented August 16, 1966

3,266,122
METHOD OF MANUFACTURING A SPRING SEAT COMPONENT
Gerard J. O'Kane, Columbus, and Vernon R. Robb, Hilliard, Ohio, and Donald E. Gunlock, Birmingham, and George C. Kinde, Mount Clemens, Mich., assignors to General Motors Corporation, Detroit, Mich., a corporation of Delaware
Filed Dec. 17, 1964, Ser. No. 419,085
3 Claims. (Cl. 29—91.1)

This invention relates to a method of manufacturing a spring seat component and more particularly to the method of manufacturing the load bearing mat subassembly of a spring seat.

The most prevalent method of manufacturing spring seats now used in industry is substantially a hand operation. When seat cushions are made by this method, the individual spring elements are assembled one at a time on a seat frame in a "building up" process which is expensive and does not lend itself to automation.

The general practice in industry is to manufacture the components of the seat spring assembly at different locations, collect these components at a central location where the seat spring assembly is manufactured and the padding and cover added to complete the seat cushion. Such practices require extensive inventory control to assure the proper amount of the various components for each individual seat spring manufactured.

An object of this invention is to provide a method of assembling spring components for a spring seat by an automatic process.

Another object of this invention is to provide a method of automatically assembling the spring elements to form a load bearing mat subassembly for a spring seat.

A further object of this invention is to provide a method of manufacturing a spring seat subassembly in which a continuous roll of fabric is passed beneath a unit which deposits individual zig-zag springs on a conveyor, the conveyor then passes the springs through an adhesive applicator and deposits the springs at regular intervals upon the fabric, the fabric and springs are then passed through a curing oven for curing the adhesive whereby the spring is adhered to the fabric with the springs adhered thereto and then the fabric is cut in the desired mat unit widths.

Figure 1:
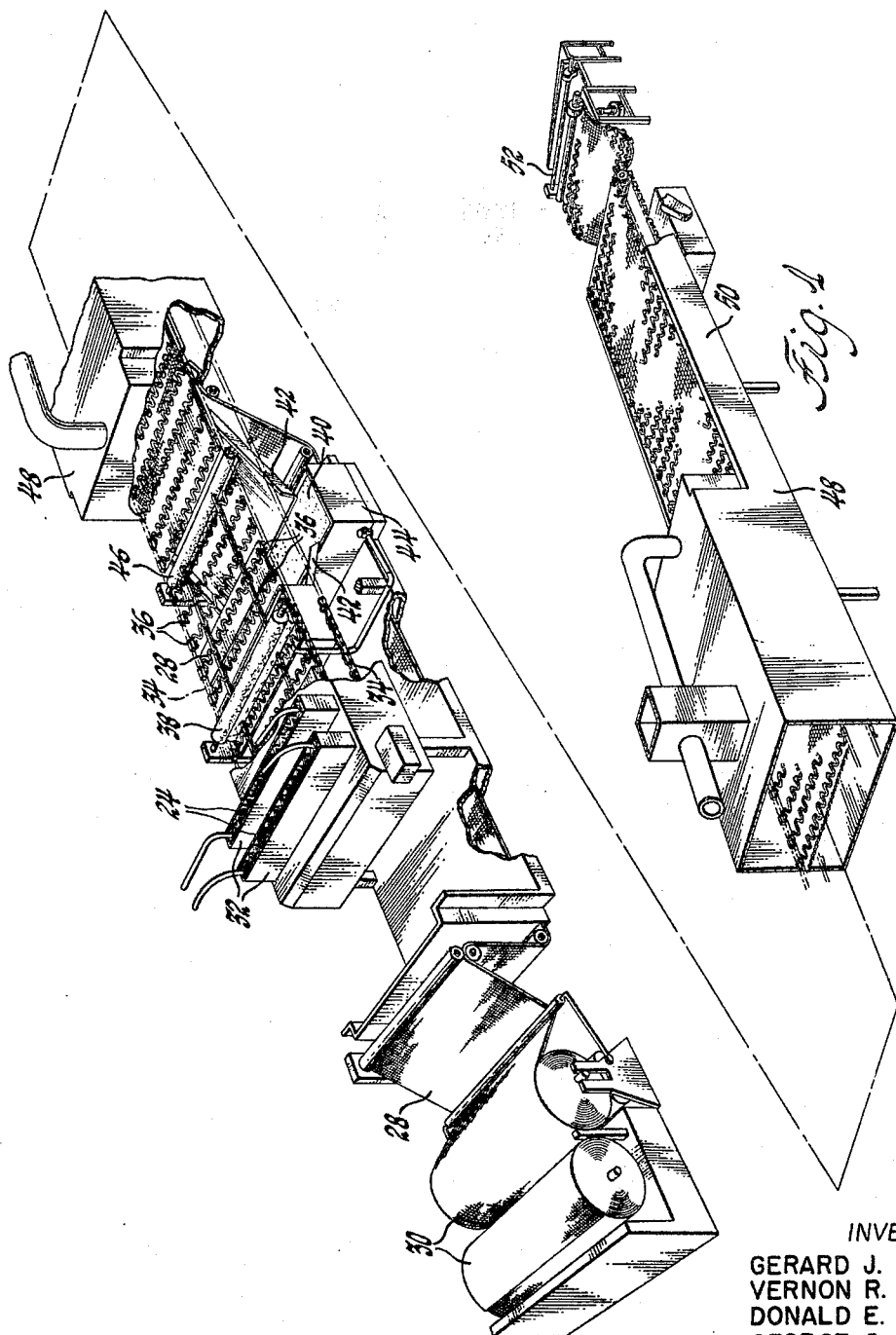
Figure 2:
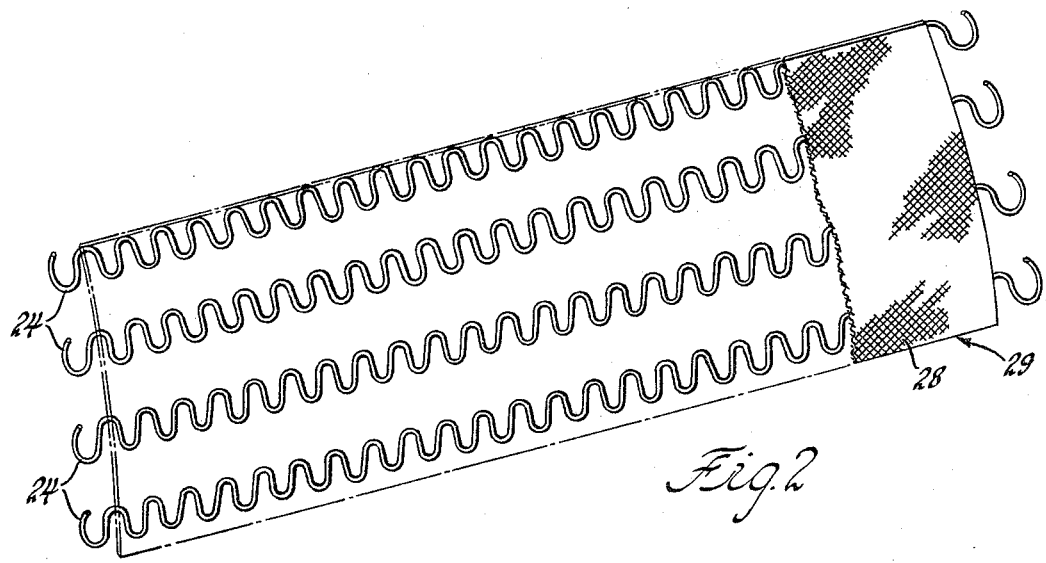
Figure 3:
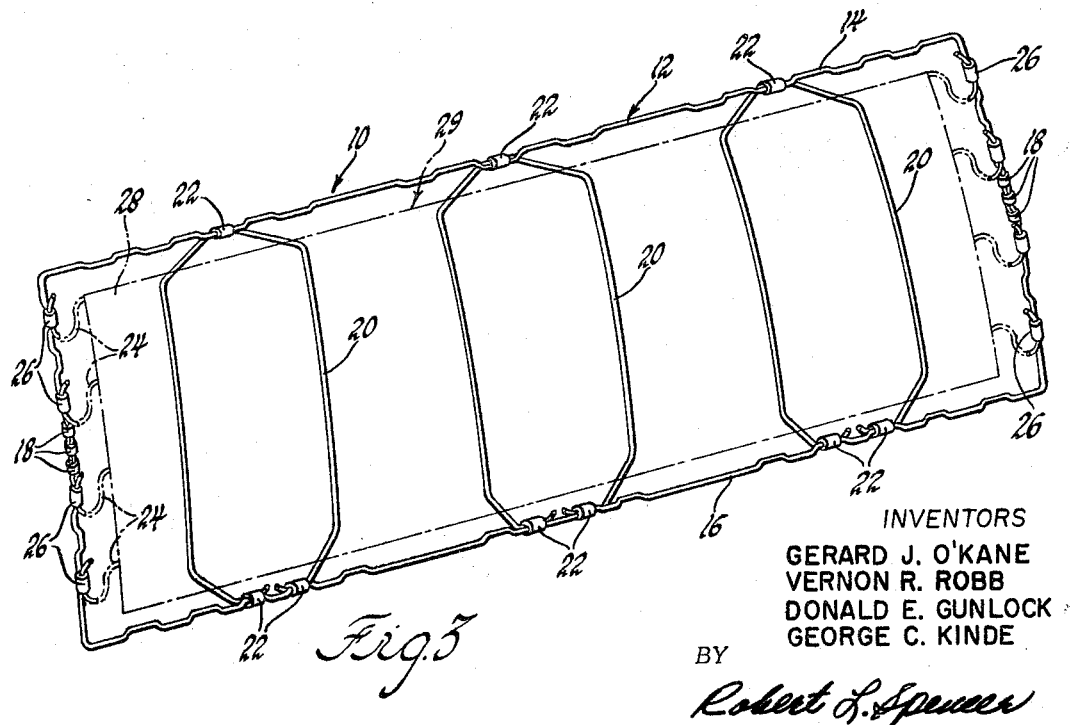

These and other objects of this invention may be readily seen from the following specification and drawings wherein:

FIGURE 1 is a view of the automated assembly line for securing the longitudinal supporting springs of the load bearing mat subassembly on the mounting fabric;

FIGURE 2 is a view of the longitudinally extending supporting springs secured on the mounting fabric, with portions broken away, as they come from the automatic assembly lines of FIGURE 1; and FIGURE 3 is a view of the load bearing subassembly showing the assembled border wire and transverse support springs with the longitudinally extending zig-zag wire and mounting fabric shown in phantom in assembled relationship.

Referring now to the drawings, as best seen in FIGURES 2 and 3, the load bearing subassembly, indicated generally by the numeral 10, has a rectangular border wire 12 which consists of two generally U-shaped wires, 14 at the top and 16 at the bottom. The generally rectangular border wire 12 is formed by joining the ends of the U-shaped wires 14 and 16 by conventional means, such as sheet metal clips 18. A plurality of generally rectangular transverse wires 20 are longitudinally spaced within the border wire and clipped to the border wire by conventional metal clips 22. A plurality of zig-zag or formed-wire spring elements 24 extend longitudinally of the border wire 12 and the ends thereof are clamped to the border wire by conventional means, such as sheet metal clips 26. The load bearing zig-zag wires 24 are bonded to the mounting fabric or insulator 28. The mounting fabric, preferably burlap, and the zig-zag springs 24 together form a mat subassembly 29 which assures proper spacing of the load bearing zig-zag springs and facilitates the handling of the springs. In their assembled position, as seen in FIGURE 3, the transverse wires 20 are positioned beneath the zig-zag springs 24 but are not secured to the zig-zag springs thus allowing movement of the springs relative thereto and preventing hard spots on the seat.

The novel method of automatically assembling the zig-zag springs 24 to the burlap mounting fabric 28 for forming the mat subassembly 29 may be easily followed by reference to FIGURE 1. Burlap coils 30 are rotatably mounted for continuously feeding a sheet of burlap 28 into the assembly apparatus. Spring wire magazines 32 hold a supply of load bearing zig-zag wires 24 for automatic discharge on a pair of driven conveyor chains 34 having spaced wire holding assemblies 36 for holding each end of the wire 24. As the spaced wires 24 are moved by the conveyor, they pass between a pair of felt applicator rolls 38 which apply an adhesive 40, preferably a polyvinyl chloride plastisol, to the springs 24. As the springs proceed on the conveyor, the excess adhesive drains from the springs and is collected by drip chutes 42 which direct the excessive adhesive to the adhesive storage tank 44 for recirculation to the felt applicator rolls 38. To further aid in removal of excess adhesive, the coated springs are passed through Teflon coated wiping rolls 46. As the coated springs proceed on the conveyor, the burlap sheet 28 is brought into contact with the adhesive coated springs and the joined springs and burlap are passed through a curing oven 48 which raises the temperature of the springs and burlap and adhesive causing the adhesive to solidify and bond the springs to the burlap, thus forming the spring mat structure. After passing through the curing oven 48, the spring mat moves over a cooling table 50 to the trimmer 52 where the mat is cut to the desired length to form the mat subassembly 29, as shown in FIGURE 3. By forming such a subassembly mat 29, the handling of the longitudinal zig-zag springs 24 is simplified and ease of assembly is enhanced; hence, the spacing of the springs may be accurately controlled to insure a proper fit when assembled to the border wire springs 12 during fabrication of the load bearing subassembly.

The mat subassembly 29 is secured to the preassembled border wire 12 and transverse wires 20 by the metal clips 26 to form the load bearing subassembly.

While but one embodiment of the subject method has been shown and described, it is obvious that rearrangements of some steps may be made without departing from the spirit and scope of the following claims.

We claim:
1. A method of making a load bearing mat subassembly for a spring assembly consisting of placing zig-zag springs in an automatic feed hopper, automatically releasing and positioning said springs one at a time onto a feed conveyor, conveying said springs through an adhesive applicator whereby said springs become coated with adhesive, having a continuous piece of fabric pass adjacent said feed conveyor, having said feed conveyor positioning and releasing said adhesive coated springs on said fabric, passing said adhesive coated springs and said fabric through a curing oven for curing said adhesive and bonding said springs to said fabric and cutting said fabric in desired lengths for the desired number of springs in each unit.

(2) depositing adhesive on said springs as said springs comprises:
   (1) depositing individual springs one at a time in spaced relation onto a conveyor,
   (2) depositing adhesive on said springs as said springs are transported by said conveyor,
   (3) passing a sheet of mounting fabric in alignment with and substantially parallel with the path of said springs,
   (4) disposing said springs and said fabric in contact with each other while said springs are transported on said conveyor, and
   (5) passing said contacting springs and fabric through an oven for curing said adhesive for effectively bonding said springs to said fabric.

3. The method of making a seat subassembly mat which comprises:
   (1) depositing individual springs one at a time on spaced wire holding assemblies of a conveyor,
   (2) depositing adhesive on said springs as said springs are transported by said conveyor,
   (3) passing a continuous sheet of mounting fabric in alignment with and substantially parallel with the path of said springs,
   (4) disposing said springs and said fabric in contact with each other while said springs are transported on said conveyor,
   (5) passing said contacted springs and fabric through an oven for curing said adhesive for effectively bonding said springs to said fabric, and
   (6) cutting said fabric into subassembly mat lengths.

References Cited by the Examiner
UNITED STATES PATENTS 1,930,484  10/1933  Ledwinka _____ 29—91.1 X
3,090,154   5/1963  Harris _____ 156—298 X JOHN F. CAMPBELL, *Primary Examiner.*

THOMAS H. EAGER, *Examiner.*